(12) United States Patent
Li et al.

(10) Patent No.: US 6,181,097 B1
(45) Date of Patent: Jan. 30, 2001

(54) HIGH PRECISION THREE-DIMENSIONAL ALIGNMENT SYSTEM FOR LITHOGRAPHY, FABRICATION AND INSPECTION

(75) Inventors: Sam Fong Yau Li; Hou Tee Ng, both of Singapore (SG)

(73) Assignee: Institute of Materials Research and Engineering, Kent Ridge (SG)

( * ) Notice: Under 35 U.S.C. 154(b), the term of this patent shall be extended for 0 days.

(21) Appl. No.: 09/249,281

(22) Filed: Feb. 11, 1999

(51) Int. Cl.[7] ................................................. G05B 19/40
(52) U.S. Cl. ......................... 318/592; 318/685; 310/317
(58) Field of Search ..................................... 318/685, 696, 318/590, 592, 593; 310/311, 314, 317

(56) References Cited

U.S. PATENT DOCUMENTS

| | | | |
|---|---|---|---|
| 5,099,216 | * | 3/1992 | Pelrine ................................. 335/220 |
| 5,325,010 | * | 6/1994 | Besocke et al. ..................... 310/317 |
| 5,327,033 | * | 7/1994 | Guckel et al. .................. 310/40 MM |

\* cited by examiner

*Primary Examiner*—Bentsu Ro
(74) *Attorney, Agent, or Firm*—Christie, Parker & Hale, LLP

(57) ABSTRACT

The present invention provides a high precision three-dimensional alignment system using SPM techniques and method of using the same. The system comprises a fine distance control unit for the effective three-dimensional micromovement in the nanometer range of a planar object, and proximity detection unit to monitor the alignment process. In the preferred embodiment, the fine distance control unit comprises a set of at least three strategically positioned fine distance control elements which are capable of controlled expansion and contraction in the nanometer range. The most preferred embodiment of the fine distance control element comprises a piezoelectric tube, which crystal size may be varied by varying an applied voltage. This system may be applied to microlithography, in which case the planar object is a scribing tool having a planar base with multiple tips fabricated on one surface.

45 Claims, 5 Drawing Sheets

US 6,181,097 B1

HIGH PRECISION THREE-DIMENSIONAL ALIGNMENT SYSTEM FOR LITHOGRAPHY, FABRICATION AND INSPECTION

FIELD OF THE INVENTION

The present invention is related to a high precision three-dimensional alignment systems using scanning probe microscopy (SPM) techniques. In particular, the present invention is related to a three-dimensional alignment system for lithography and fabrication. The present invention also relates to a high precision alignment system for SPM inspection.

BACKGROUND OF THE INVENTION

Since the advent of scanning tunneling microscopy and atomic force microscopy, intensive research interest in the field of nanometer and submicrometer length scale surface modifications utilizing the above-mentioned techniques has been expressed. These fabrications usually involve controlled modifications of the surface morphologies which are critical and important for the fabrication of miniaturized micromechanical and electronic devices with nanometer scale dimensions. It becomes more significant when one considers the limitations encountered by the photolithography systems as device dimensions are constantly being scaled down to the submicron regime. The lack of efficient light source past the ArF laser line at 193 nm and the unavailability of good optical materials may limit prompt application of such photolithography systems. Although other techniques like the e-beam and X-ray lithography may serve as attractive alternatives, precise optimization of process parameters and technical-related issues may further hinder their participation.

Attempts to achieve small features using nanolithography systems have been described. For example, U.S. Pat. Nos. 5,517,280 and 5,666,190, disclose the use of a scribing tool (in this case a photolithographic wafer) with an array of cantilevers and tips to create features in a fabrication wafer. Waveguides extend longitudinally along the bottom surface of the cantilevers, and an aperture in the waveguide is placed at the apex of a tip on the end of each cantilever. The photolithographic wafer is brought into close proximity with the fabrication wafer such that a gap separates the tip from the surface of the fabrication wafer. A piezoresistor coupled to each cantilever allows the resonance frequency of the cantilever to vary according to the size of the gap. In order to obtain a uniformly suitable gap between every tip and the fabrication wafer i.e. to get a uniform tip height, a capacitive plate is provided above the cantilever. A DC electric field between the capacitive plate and the fabrication wafer causes the thicker portion of the cantilever to flex. The cantilever continues to flex until the gap is adjusted to the proper level, indicating the correct spacing for proper exposure of photoresist on the surface of wafer. Although this photolithography method allows a plurality of cantilevers to operate within the same photolithographic wafer, there are the following limitations to the method. Firstly, the fabrication of the cantilevers and waveguides is a complex process and therefore expensive. In addition, due to the complex fabrication process, the resulting cantilevers and tips within the same wafer are often not uniform, resulting in difficulties in obtaining uniform alignment of tip heights. This problem is partially solved by providing the capacitive plates to allow for individual adjustment of each cantilever. However, this means that numerous electrical connections and capacitive plates have to be provided along the surface of the photolithographic wafer. This not only makes the circuitry extremely complex, but also limits the number of cantilevers which can be realistically controlled within one photolithographic wafer. Secondly, if a cantilever has to be flexed to a relatively large degree before the desired gap distance can be reached, the tip may be positioned to face the fabrication wafer at an angle substantially different from normal. This may further affect the lithographic step when the reactive light is applied to photoresist surface.

U.S. Pat. No. 4,991,962 discloses a high precision alignment system for aligning a mask with a wafer in a high resolution nanolithography system using optical methods. The alignment is accomplished by observing alignment targets such as multiple diffraction gratings on the mask and the wafer to generate interference signals. It is clear that although alignment obtained using this method is in the order of a few nanometers, this method only allows two dimensional alignment. When a third dimension of alignment is required, such as for multiple tip scribing wafers, this method would not be useful for preventing tilting of scribing tools.

OBJECT OF THE INVENTION

It is therefore an object of the present invention to provide a system to overcome the shortcomings as stated above and give precision three-dimensional alignment.

It is another object of the present invention to reduce the requirement for complex scribing tool designs in nanolithography.

It is a further object of the present invention to provide an SPM system which allows for multi-probe imaging of surfaces.

SUMMARY OF THE INVENTION

The present invention provides a high precision three-dimensional alignment system using SPM techniques. The system comprises a fine distance control unit for the effective three-dimensional micromovement in the micro- to nanometer range of a planar object, and proximity detection unit to monitor the alignment process.

For the purposes of understanding the present invention, substrate is defined as a structure with a surface whereon processes according to the present invention is performed. For standard applications, the substrate would have a planar surface whereon lithography or scanning is performed, and may contain features with various recesses. Lateral movement refers to the movement of the substrate or tool along the plane i.e. the X and Y axis of FIGS. 1 and 2. Axial movement refers to the movement in a direction substantially normal to the planar surface of the substrate or tool along the Z-axis as shown in FIGS. 1 and 2.

In the preferred embodiment, the fine distance control unit comprises a set of at least three strategically positioned fine distance control elements which are capable of controlled expansion and contraction in the nanometer range. The most preferred embodiment of the fine distance control element comprises a piezoelectric tube, which crystal size may be varied by varying an applied voltage. This system may be applied to nanolithography, in which case the planar object is a scribing tool having a planar base with multiple tips fabricated on one surface. These tips may be used to create features on substrates such as wafers. In order to obtain uniform features from every tip, the system according to the present invention is capable of providing three-dimensional alignment such that a uniform distance over the entire surface between scribing tool and the substrate may be achieved. A proximity detector is provided to monitor the distances between the tool and substrate, and to send information to a feedback unit to control the scribing process. A coarse distance control unit comprising a translational means such as a conventional stepper motor may also be provided to allow for initial approach of the scribing tool towards the substrate. One or more piezoelectric elements may be used to provide micromovements of the stage in which the substrate is mounted. As multiple tips are used, efficiency is highly improved over single tip microlithographic systems, while at the same time maintaining a relatively simple electronic control system. From the fine and effective distance control, well-formed uniform features are produced.

In another embodiment of the present invention, the alignment system is used in the multi-probe imaging of a surface. In this embodiment, multiple scanning probes on a probing tool are aligned with the surface to be scanned using the alignment system of the present invention. Signals generated by each scanning probe are then sent to a central SPM control unit for processing.

DESCRIPTION OF THE INVENTION

The present invention uses scanning probe microscopy techniques to provide a high precision three-dimensional microalignment system. Microalignment and micromanipulation refer to alignment and manipulation on a micrometer, nanometer or subnanometer scale. The features of this system is described below using nanolithography as an example. The nanolithography features and images produced may be as small as subnanometers to hundreds of nanometers. Two embodiments of the present invention will be described. In both embodiments, piezoelectric material is provided for the fine distance control unit. The first embodiment provides a piezoelectric sensor to sense the approach of the scribing tips. The second embodiment provides other types of proximity detectors for the same purpose.

Figure 1:
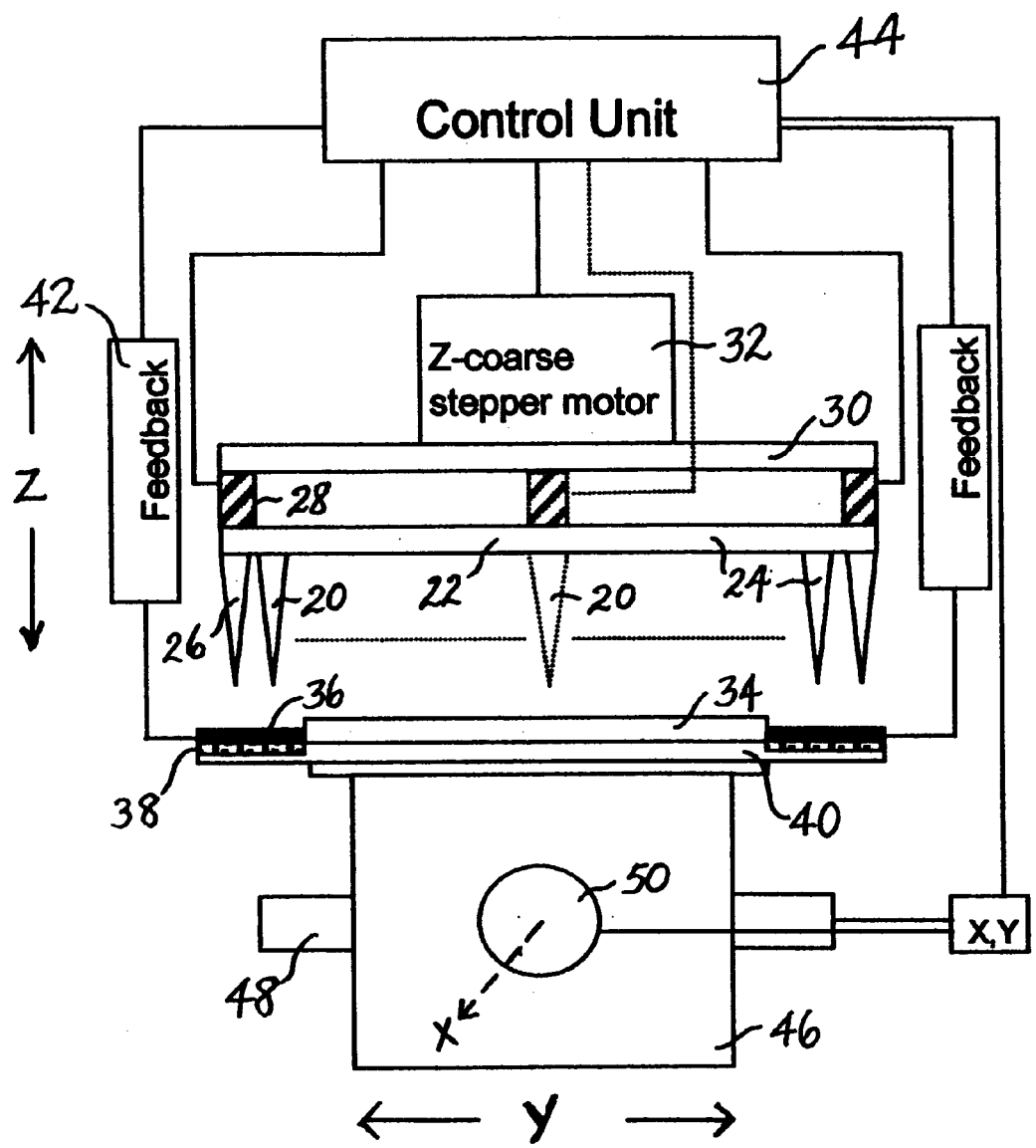
FIG. 1 is a schematic diagram of a nanolithography system according to one embodiment of the present invention.

Referring to FIG. 1, this embodiment of the present invention comprises a plurality of tips 20 fabricated on the base 22 of a scribing tool 24 such as a silicon wafer to perform fabrication of sub-100 nm features, openings and trenches on a substrate. These tips are ideally of uniform height, and microfabricated onto a flat surface of the base of a scribing tool. Three or more of the tips are used as sensor tips 26 and are strategically positioned at the periphery of scribing tool 24. These sensing tips are coated with conductive material to allow connections to the adjacent piezoelectric tubes 28 electronically. The remaining scribing tips may also be coated with a electrically conducting material, depending on the various applications. The piezoelectric tubes 28, which serve as the fine distance control unit, are attached to a thermally stable support 30. A z-coarse stepper motor 32, attached to the thermally stable support, is used to facilitate coarse movement of the scribing tool towards the substrate 34. In this embodiment, the proximity detector includes a plurality of conductive pads 36 and piezoelectric supports 38 positioned directly underneath the three or more peripheral tips. This proximity sensing technique is similar to the electron tunneling technique in SPM, and known to one skilled in the art. The conductive pads 36 and the piezoelectric supports 38 are aligned with the fabrication wafer 34 on the sample holder 40, and sends signals via the feedback loops 42 to the SPM control unit 44 to monitor the distance between the peripheral tip and its corresponding conductive pad. The sample holder is attached to stage 46 which contains an X-piezoelectric scanner 48 and a Y-piezoelectric scanner 50 to allow the stage to move in the lateral X and Y directions in relation to the scribing wafer.

In the microlithography process, the substrate whereon patterns are to be produced is fixed onto the sample holder 40 and the stage 46. The scribing toot is brought into close proximity with the substrate using the Z-coarse stepper motor 32. The coarse alignment process may be assisted by video cameras mounted at suitable positions, or by proximity sensors if alignment features are present on the substrate. Additional stepper motors or other translational means may be provided if coarse movements in the X and Y directions are also desired. When the distance is very close, the conductive pads 36 and piezoelectric supports 38 would detect the presence of the sensing tips 26, and send the information back to the central control unit 44. Depending on the technique chosen for scribing, the central control unit will send an appropriate voltage to direct each piezoelectric tube 28 to expand or contract. Due to the strategic positioning of the piezoelectric tubes and their corresponding sensing tips 26, the entire surface of the scribing tool may be tilted and adjusted to three-dimensionally aligned with the substrate 34 below. For oxidation-induced modifications of the substrate, only close proximity of the tips in the Angstrom to nanometer range to the substrate is sufficient, and physical interaction of the tip is not required. If physical modification substrate is required, for example to physically create a hole in a resist layer on the surface of the substrate, then the SPM control unit will feedback to the fine distance control unit to fully or partially penetrate the resist layer, and create a hole in the resist layer. If larger holes are required, circular motions of the tips may be provided. If trenches are required, the SPM control unit can signal the X or Y-piezoelectric scanner in the stage to move after the tips penetrate the resist layer. This results in the lateral movement of the substrate, resulting in the creation of trenches. If the lateral movement does not require microcontrol, then a stepper motor may be used to control the lateral movement of the stage, rendering the stage and the piezoelectric scanners not necessary.

Figure 2:
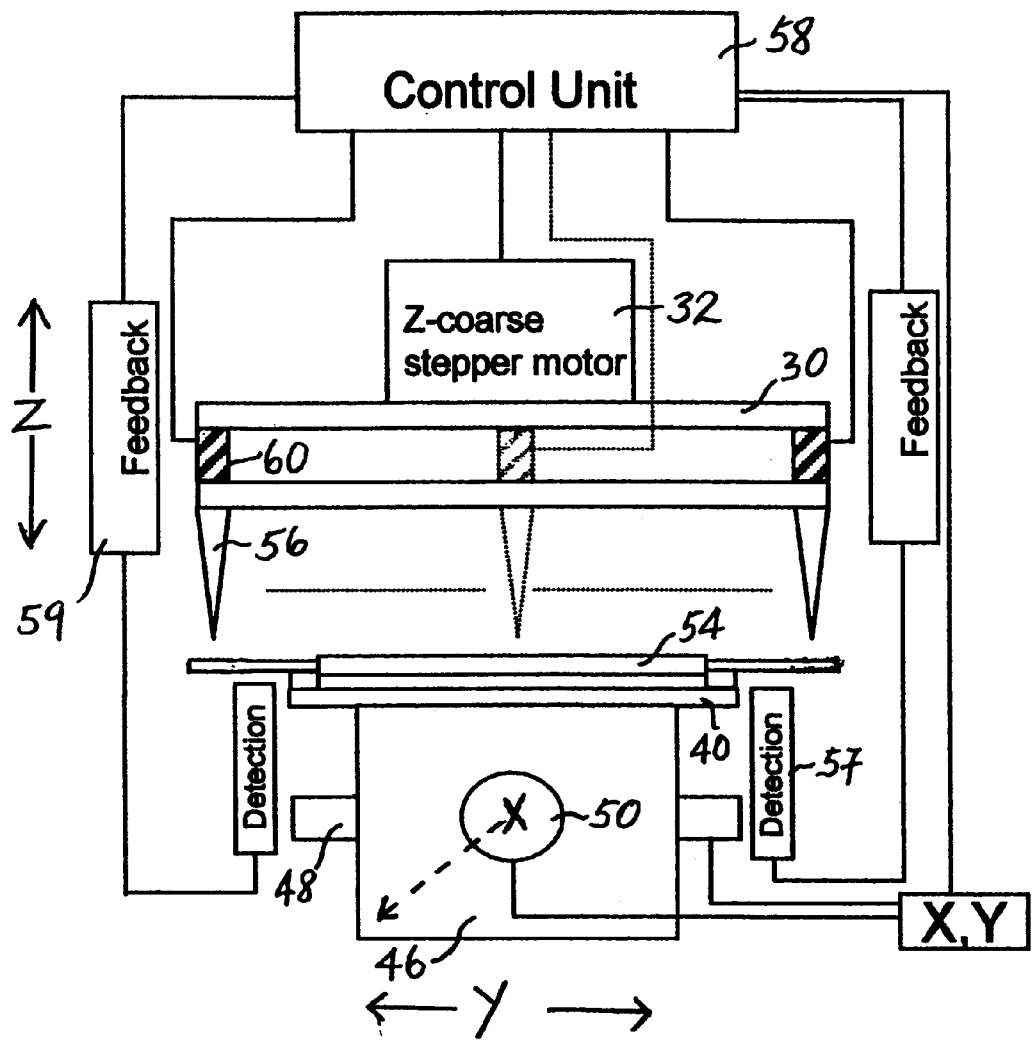
FIG. 2 is a schematic diagram of a nanolithography system according to another embodiment of the present invention
Figure 3A:
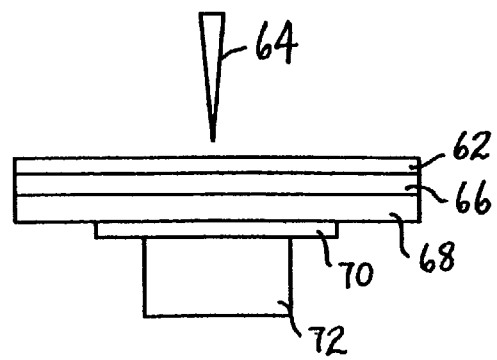
FIGS. 3A–3D are schematic diagrams to illustrate a process for fabrication and transfer of sub-100nm features onto any underlying substrate.
Figure 3B:
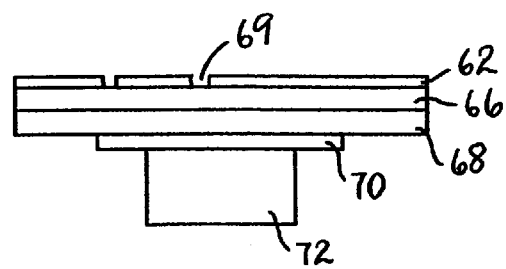
Figure 3C:
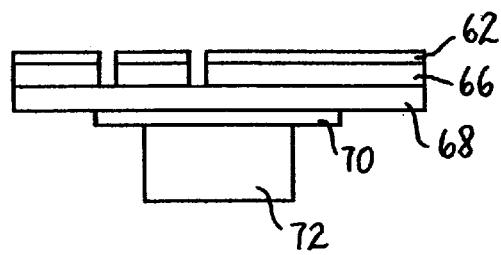
Figure 3D:
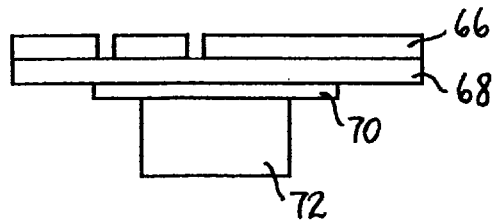
Figure 4A:
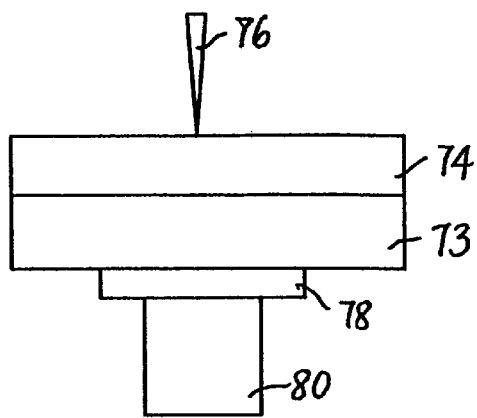
FIGS. 4A–4D are schematic diagrams to illustrate another process for fabrication and transfer of sub-100 nm features onto any underlying substrate.
Figure 4B:
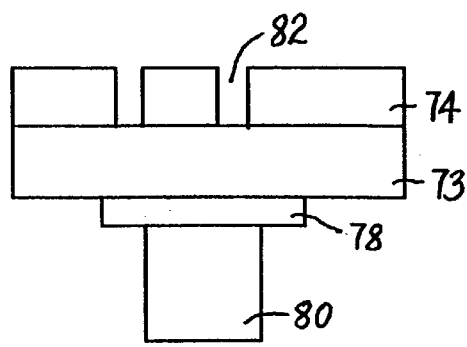
Figure 4C:
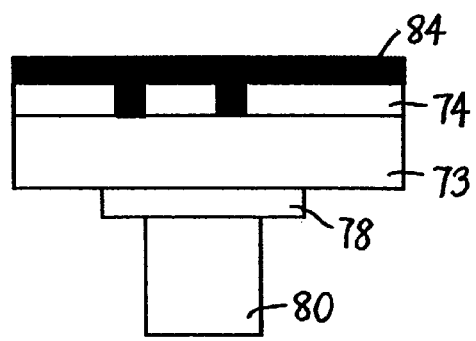
Figure 4D:
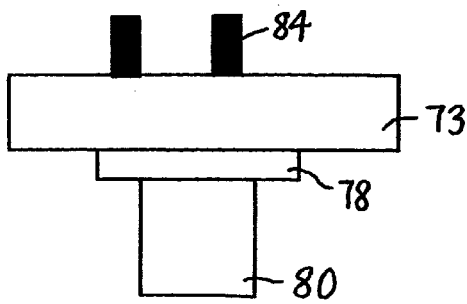

FIG. 2 shows a design that uses alternative detection methods with associated circuitry and feedback systems. In this embodiment, a plurality of proximity detector other than a piezoelectric sensor is provided, such as a optical beam def ion system or a capacitance detection system. In the optical beam defection system, a monitoring cantilever 52 is provided at the periphery of the substrate 54 directly below the sensing tip 56. A laser source and a photodiode detector 57 is used to detect any movement of the monitoring cantilever. As the tip touches the monitoring cantilever, small movements in the nanometer range can be detected by system. Signals collected by the SPM control unit 58 from the various detectors feeds back 59 to individual piezoelectric tubes 60 of the fine distance control unit to adjust the axial distance to ensure complete alignment.

FIG. 3 further illustrates a process for the fabrication and transfer of sub-100nm features, trenches and openings onto the underlying substrate. In FIG. 3A, the top layer 62 is a mask layer which may be a resist having a thickness of between about 10 nm and 1500 nm that permits modifications relatively easily by one or more tips 64 and able to withstand subsequent pattern transfer process steps. An example of such a material could include photoresist and polymethyl methylacrylate (PMMA). The second layer 66 is preferably made of dielectric material such as silicon dioxide, which allows etching to occur. The third layer 68 is the substrate that acts as an efficient etch stop. The depth of the features 69 attainable in the second layer 66 after scribing (FIG. 3B) may also be controlled e.g. via time etch process. As mentioned earlier, the entire substrate may rest on a sample holder 70 which is attached to a stage 72 containing one or more piezoelectric scanners. As described above, the axial movement of the tips on the scribing tool is facilitated by the movement of the z-coarse motor and the piezoelectric scanners as shown in FIGS. 1 and 2. After successful pattern transfer into the second layer 66 by dry etching techniques like the plasma etching and reactive ion etching and/or wet chemical etching (FIG. 3C), the top layer 62 may be stripped away to expose the second layer 66 to reveal sub-100 nm features (FIG. 3D). Prior to the pattern transfer step, a cleaning step to remove any trace amount of debris that is generated during the microfabrication may be performed if necessary.

FIG. 4 shows another process for the microfabrication of sub-100nm features onto substrate 73. In FIG. 4A, mask layer 74 such as a resist has a thickness of between about 10 nm and 1500 nm that permits modifications relatively easily by the plurality of microfabricated tips 76. An example of such a material would include photoresist and PMMA. As in the method shown in FIG. 3, the entire substrate may be rested on a sample holder 78 which is attached to stage 80 containing one or more piezoelectric scanners. After tip approach, trenches and openings 82 are produced in the mask layer 74 as shown in FIG. 4B. This is followed by deposition of materials like a metal 84 as shown in FIG. 4C, for example by sputtering and electroplating, and subsequently followed by removal of the mask layer via conventional lift-off process to achieve formation of features as shown in FIG. 4D. Prior to the deposition step, a cleaning step to remove any trace amount of debris that is generate during microfabrication may be performed if necessary.

While the present invention has been described particularly with references to FIGS. 1 to 4 with emphasis on a microlithography system, it should be understood that the figures are for illustration only and should not be taken as limitation on the invention. In addition it is clear that the method and apparatus of the present invention has utility in many applications where micromovemerit and three-dimensional leveling is required. It is contemplated that many changes and modifications may be made by one of ordinary skill in the art without departing from the spirit and the scope of the invention described.

The fabrication system and process described above has important applications in the fabrication of features on silicon wafer having a precoated mask layer. Beside silicon wafers, this microlithographic system may be used on other substrates, such as metallic surfaces. For silicon wafers, the tip may be made from silicon, doped silicon and silicon nitride. If lithography on harder surfaces is desired, diamond or equivalent material may be used as tips. Although the system as shown in FIGS. 1 and 2 are depicted with the stage at the bottom and the scribing/probing unit approaching the sample holder from above in a top-down approach, the entire system may be rotated 180 degrees, such is the scribing/probing unit is below the stage, and the probes/tips are pointing upwards in a bottom-up approach.

Although mechanical modification of the resist layer is used as examples in FIGS. 3 and 4, it should be understood by one in the art that the present invention is useful for other types of modification such as physical or chemical modifications. For different modes of interactions, different circuitry of the SPM central control unit and feedback detection techniques may be used.

Besides piezoelectric detector, optical beam deflection system and capacitance detection system, other detection methods obvious to one skilled in the art may also be used to detect the distance between one point of the scribing tool and its corresponding point of the substrate such as different modes of SPM.

For the fine distance control unit, the best mode disclosed herewith is a plurality of piezoelectric elements. It is contemplated that other materials, such a heat-expandable materials may be adapted for use in the fine distance control unit. Furthermore, it is possible to have a fine distance control unit comprising only one piezoelectric element containing a plurality of piezoelectric tubes, which allow three dimensional alignment of the scribing tool.

Figure 5:
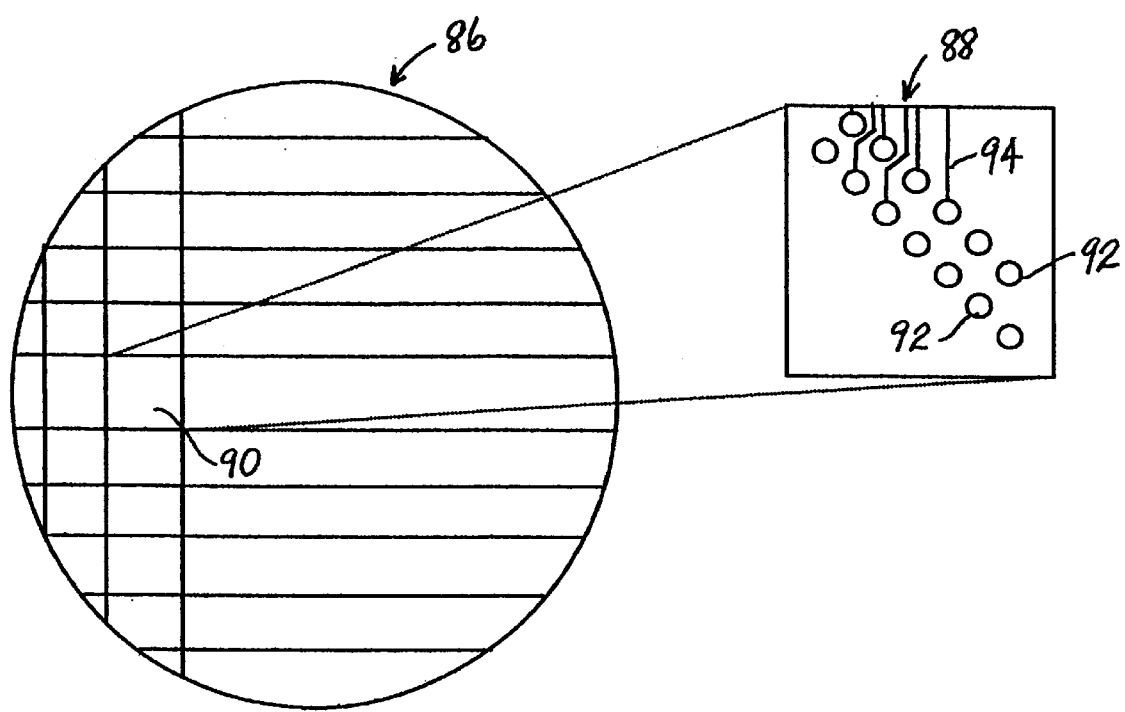
FIG. 5 is a schematic diagram to illustrate an array of probes on a probing tool.

Another application envisioned for the present invention is the simultaneous imaging and data collection of a surface. This is achieved by coating all the tips of a scribing tool with a electrically conducting material, and then providing the necessary electrical connections to form a probing tool for SPM imaging. FIG. 5 shows a probing tool 86 with an enlarge view 88 of the area 90. The enlarged view shows tips 92 with electrical connections 94 for communication with the central monitoring unit. An example of surfaces which can be probed in this manner includes silicon wafers and any other objects with a flat surface. In this embodiment, the microalignment system allows all the tips to be axially aligned with the surface to be probed.

In addition to serving as an imaging probe, this probe may also serve as, for example: (1) a resistivity meter to measure the sheet resistance of thin solid conductive or semiconductive film; (2) a carrier lifetime tester to measure the minority carrier lifetime in silicon; (3) a capacitance-voltage tester to measure the device C-V characteristics such as the gate-oxide threshold; and (4) a device failure detector, for example, to detect hot spots of faulty devices. The layout of the electrical connection to each individual probe may be designed according to customers' specifications and intended purposes. A further possible application using the probing tool is to utilize it as a deposition tool whereby upon applying a pulse voltage, subnano- to nanometer sized dots or molds may be deposited from the tips of the probes that have been coated with a suitable metallic material. For example, the probes may be coated uniformly with a layer of copper. Upon tip approach into the contact holes or vias, and execution of the pulse voltage, Cu nucleates may be deposited in the contact holes/vias which may then serve as nucleation sites for subsequent process steps like electroless or electroplating processes.

Piezoelectric scanners are used to provide fine lateral movement for the substrates, It would be understood that other conventional instruments such as Z-coarse motors may also be added if coarse control is required for lateral movements in various directions.

The number and positioning of the array of tips depend on the applications. Besides tips microfabricated directly onto the scribing tool, tips microfabricated on cantilevers may also be used. Tips on cantilevers are particularly useful for processes which require complete tip penetration e.g. for creating trenches in the resist layer in the process described in FIG. 4. In this process, complete penetration is preferred, as the metallic deposition 84 is more stable if it is deposited directly onto the underlying substrate. Due to the flexibility offered by the cantilevers in the axial direction, the tips, even if their resting height may not be completely uniform, may be moved axially to completely penetrate the resist layer without the risk of breaking.

One or more motors may be used as part of the coarse control unit which provides means for coarse movement in various desired directions. Besides motors, other translational means may also be used, such as hydraulic and mechanical means.

The above nanolithography methods may also be performed under liquid environment. An advantage of having the presence of liquid on the surface of the substrate is that debris may be more easily removed. In addition, a washing step may also be added after scribing to rinse away stubborn debris. This is usually followed by a drying and/or baking step before etching is performed. If the liquid layer is a thin film, it is possible to use the bottom-up approach with the scribing tip facing downwards, but if the substrate is required to be submerged in liquid, the top-down approach is required, in which the stage contains the liquid and the scribing tips are pointing downwards.

What is claimed is:

1. A high precision microalignment instrument comprising:
   a) a central control unit;
   b) a coarse control unit coupled to the central control unit, the coarse control unit adapted for attachment onto an object to be aligned;
   c) a fine distance control unit coupled to the central control unit, said fine distance control unit comprising at least one fine distance control element, said control element adapted for attachment onto said object at a strategic position;
   d) a sample holder adapted to receive a substrate;
   e) a proximity detection unit for detecting the distance between said object and said substrate at a plurality of strategic points, said proximity detection unit electronically coupled to the central control unit for sending feedback signals;
whereby the distance between the object and the substrate can be adjusted by the fine distance control unit and the coarse control unit based on the feedback signal obtained from the proximity detection unit.

2. A high precision microalignment instrument according to claim 1 wherein the object is a tool.

3. A high precision microalignment instrument according to claim 2 wherein the tool is a scribing tool or a probing tool.

4. A high precision microalignment instrument according to claim 3 wherein the tool has a base with a planar surface wherefrom a plurality of tips project.

5. A high precision microalignment instrument according to claim 4 wherein one or more of the tips are coated with a electrically conductive material.

6. A high precision microalignment instrument according to claim 4 wherein the tips of said tool is attached to the ends of cantilevers.

7. A high precision microalignment instrument according to claim 2 wherein said tool is made from silicon, silicon nitride or doped silicon.

8. A high precision microalignment instrument according to claim 1 wherein the substrate comprises a silicon wafer.

9. A high precision microalignment instrument according to claim 1 wherein the central control unit comprises a scanning probing microscope control unit.

10. A high precision microalignment instrument according to claim 1 wherein the coarse control unit comprises a translational means.

11. A high precision microalignment instrument according to claim 10 wherein the translational means is a z-coarse stepper motor.

12. A high precision microalignment instrument according to claim 10 wherein the translational means of the coarse control unit provides means for axial movement to the object to be alignment.

13. A high precision microalignment instrument according to claim 1 wherein the coarse control unit comprises a plurality of translational means to provide movement of the object in a plurality of directions.

14. A high precision microalignment instrument according to claim 1 wherein the coarse control unit is attached to a support whereon the object is attached.

15. A high precision microalignment instrument according to claim 14 wherein said support is a thermal stable support.

16. A high precision microalignment instrument according to claim 1 wherein the fine control unit is attached to a support whereon the object is attached.

17. A high precision microalignment instrument according to claim 16 wherein said support is a thermal stable support.

18. A high precision microalignment instrument according to claim 1 wherein the fine control unit comprises a fine control element.

19. A high precision microalignment instrument according to claim 18 wherein the fine control element comprises piezoelectric material.

20. A high precision microalignment instrument according to claim 18 wherein the fine control element comprises at least one piezoelectric tube.

21. A high precision microalignment instrument according to claim 1 wherein the sample holder comprises a stage for the attachment of said substrate.

22. A high precision microalignment instrument according to claim 1 wherein the sample holder comprises a stage and a stage fine distance control unit for movement for the stage.

23. A high precision microalignment instrument according to claim 22 wherein the stage fine distance control unit comprises at least one fine distance control element.

24. A high precision microalignment instrument according to claim 23 wherein the stage fine distance control element comprises piezoelelctric material.

25. A high precision microalignment instrument according to claim 22 wherein the stage fine distance control unit comprises at least one piezoelectric scanner.

26. A high precision microalignment instrument according to claim 25 wherein the fine distance control unit comprises an X piezoelectric scanner and a Y piezoelectric scanner, the X and Y piezoelectric scanners aligned substantially normal to each other to provide means for lateral movement for the stage.

27. A high precision microalignment instrument according to claim 26 wherein the fine distance control unit further comprises a Z piezoelectric scanner aligned substantially normal to the X and Y piezoelectric scanner to provide means for axial movement of the stage.

28. A high precision microalignment instrument according to claim 1 wherein the sample holder comprises a stage attached to a stage coarse distance control unit.

29. A high precision microalignment instrument according to claim 28 wherein the stage coarse distance control unit comprises a stage motor.

30. A high precision microalignment instrument according to claim 29 wherein the stage motor is a z-coarse stepper motor.

31. A high precision microalignment instrument according to claim 1 wherein the proximity detection unit comprises a piezoelectric sensor.

32. A high precision microalignment instrument according to claim 1 wherein the proximity detection unit comprises an optical deflection system or a capacitance detection system.

33. A micoralignment method using a high precision microalignment instrument, said instrument having a central control unit; a proximity detection unit and a coarse control unit both attached to an object to be aligned and coupled to the central control unit; a fine distance control unit strategically attached to the object to be aligned and coupled to the central control unit; and a sample holder for receiving a substrate; said method comprising the steps of:

a) attaching the substrate to the sample holder;

b) moving a scribing tool to proximate the substrate by the coarse control unit;

c) monitoring the distances between the scribing tool and the substrate using the proximity detection unit; and d) moving the scribing tool to the desired alignment with the substrate.

34. A micoralignment method according to the claim 33 wherein an additional micro-lithography process is provided comprising the additional step of:

(e) axially moving the scribing tool to approach the substrate such that the surface of the substrate is modified.

35. A micoralignment method according to the claim 34 wherein the substrate is mechanically modified.

36. A micoralignment method according to the claim 34 wherein the substrate is modified by oxidation.

37. A micoralignment method according to the claim 34 wherein an additional step is provided comprising:

(g) laterally moving the scribing tool relative to the substrate such that the surface of the substrate is further modified.

38. A micoralignment method according to the claim 37 wherein the further modification is mechanical modification.

39. A micoralignment method according to the claim 37 wherein the further modification is oxidation-induced modification.

40. A micoralignment method according to claim 33 wherein the central control unit is a scanning probe microscope control unit, and the object is a probing tool with a plurality of probes, and an additional step of collecting signals from the probes is provided.

41. A product with surface features produced by a method using a microlithography system, said system having a central control unit; a proximity detection unit and a coarse control unit both attached to a scribing tool and coupled to the central control unit; a fine distance control unit strategically attached to the scribing tool and coupled to the central control unit; and a sample holder for receiving a substrate; said method comprising the steps of:

a) attaching the product to the sample holder;

b) using the proximity detection unit to monitor the distances between the scribing tool and the substrate;

c) moving the scribing tool to proximate the substrate;

d) collecting signals by the central control unit from the proximity detection unit;

e) aligning the scribing tool to the substrate by the axial and lateral movements of the fine distance control unit; and f) creating features on the surface of said product by the movement of the scribing tool in relation to the substrate.

42. A product according to claim 41 wherein the product is a wafer.

43. A product according to claim 42 wherein at least one surface of the wafer is precoated with a mask layer, and features on the wafer are created by the additional steps of:

(f) creating holes or trenches in the mask layer by movement of the scribing tool in relation to the substrate;

(g) applying etching or deposition methods on the substrate; and (h) removing the masking layer.

44. A product according to claim 43 wherein said holes and trenches are made by mechanical modification or oxidation-induced modification.

45. A product according to claim 43 wherein said precoated surface of said wafer comprises at least a layer of dielectric material below the mask layer, and etching is performed to remove the exposed dielectric layer before the mask layer is removed.

\* \* \* \* \*